(12) United States Patent
Canfield

(10) Patent No.: US 10,041,526 B2
(45) Date of Patent: Aug. 7, 2018

(54) HAND-LINE HOOK

(71) Applicant: Buckingham Manufacturing Company, Inc., Binghamton, NY (US)

(72) Inventor: DeForest C. Canfield, Oxford, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 15/637,425

(22) Filed: Jun. 29, 2017

(65) Prior Publication Data

US 2018/0003214 A1    Jan. 4, 2018

Related U.S. Application Data

(60) Provisional application No. 62/356,142, filed on Jun. 29, 2016.

(51) Int. Cl.
*F16B 45/02* (2006.01)
*F16G 11/14* (2006.01)
*A62B 35/00* (2006.01)

(52) U.S. Cl.
CPC ............ *F16B 45/025* (2013.01); *F16B 45/02* (2013.01); *F16G 11/14* (2013.01); *A62B 35/0037* (2013.01)

(58) Field of Classification Search
CPC .......... Y10T 24/4534; Y10T 24/45361; Y10T 24/45366; F16B 45/02; F16B 45/025
See application file for complete search history.

(56) References Cited

U.S. PATENT DOCUMENTS

| | | | | |
|---|---|---|---|---|
| 1,879,167 | A * | 9/1932 | Freysinger | F16B 45/02 24/599.5 |
| 1,949,608 | A * | 3/1934 | Johnson | F16B 45/02 24/599.5 |
| 2,256,164 | A * | 9/1941 | Mahoney | B66C 1/36 24/600.1 |
| 5,579,564 | A * | 12/1996 | Rullo | F16B 45/02 24/599.4 |
| 8,001,663 | B2 * | 8/2011 | Belcourt | F16B 45/02 24/599.5 |
| 9,032,595 | B2 * | 5/2015 | Lin | F16B 45/02 24/599.5 |
| 9,199,105 | B1 * | 12/2015 | Hung | A62B 35/0068 |
| 9,382,939 | B1 * | 7/2016 | Rullo | F16B 45/02 |
| 2011/0126386 | A1 * | 6/2011 | Liang | F16B 45/02 24/599.5 |

* cited by examiner

*Primary Examiner* — Abigail E Troy
(74) *Attorney, Agent, or Firm* — Bond Schoeneck & King, PLLC; George McGuire; Frederick Price

(57) ABSTRACT

A hand line hook having a curved body portion, a gate pivotally attached to the body, and a gate lock pivotally attached to the body. Detents are formed in the gate lock to further lock the gate in either its open or closed positions.

3 Claims, 1 Drawing Sheet

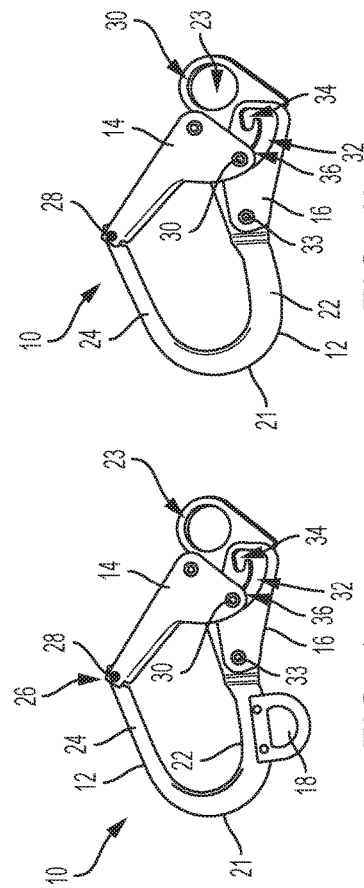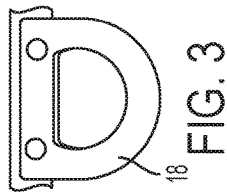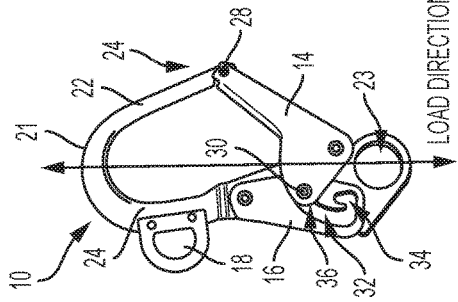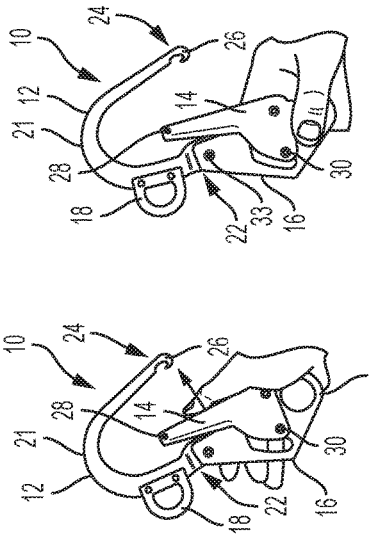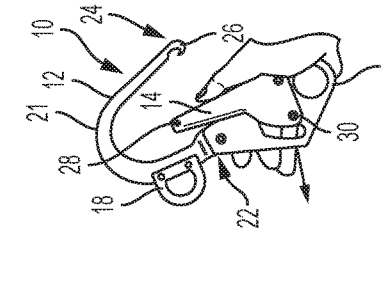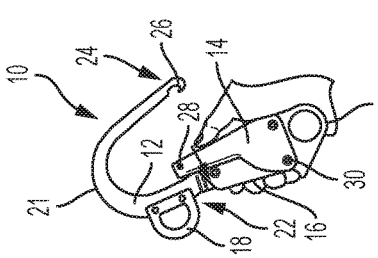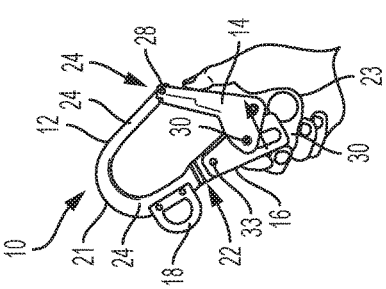

HAND-LINE HOOK

REFERENCE TO RELATED APPLICATION

The present application relates and claims priority to Applicant's Provisional Patent Application, Ser. No. 62/356,142, filed Jun. 29, 2016, the entirety of which is hereby incorporated by reference.

BACKGROUND

1. Field of Invention

The present invention relates generally to hand line hooks, and more particularly to hand line hooks used by utility lineman.

2. Background of Art

Hand line hooks are used by utility lineman to raise and lower tools and equipment from the ground to a lineman working on top of a utility pole. Most typically the hand line hook simply comprises a hook and an eye through which the hand line can be passed. The tools or equipment are placed over the hook (e.g., typically placed in a bucket with the bucket handle being placed in the hook). By tying the hand line through the eye of the hook the workers can then raise and lower the hook carrying the tools and equipment. Additional devices, such as pulleys, can be used to decrease the amount of force required to raise and lower the load.

Hand line hooks are not traditionally designed to carry heavier loads, such as a person in need of rescue. While the hooks strength may be sufficient, the open nature of the hook makes such rescue use dangerous. Thus, when a rescue is needed, utility workers typically need a different device to assist with lowering the worker in need of rescue safely to the ground.

3. Objects and Advantages

It is a principal object and advantage of the present invention to provide a gated rated hand line hook that can be used for both traditional hand line hook uses and as a rescue device.

It is a further object and advantage of the present invention to provide a hand line hooks that can be used with a closed gate.

Other objects and advantages of the present invention will in part be obvious and in part appear hereinafter.

SUMMARY OF THE INVENTION

The present invention comprises a hand line hook of the type typically used by utility lineman. An embodiment of the hand line hook is gate rated and can be used in conjunction with rated accessories, for lifting heavy loads, and for rescue operations. In its preferred embodiment, the hand line hook has a working load limit of approximately 2500 lbf when its gate is closed, and 1000 lbf when the gate is open and in the intended direction of load.

In an embodiment, the hand line hook comprises: (i) a hook body comprising a curved nose section positioned between a first end section and a second end section that terminates in a curved gate detent; (ii) a spring-biased, elongated gate pivotally connected at one end to the hook body in proximity to the load bearing eye and comprising a rivet that extends transversely thereacross and is pivotally movable into and out of engaged relation with the curved gate detent, wherein the hook body is closed when the rivet is in engaged relation with said curved gate detent and is open when not engaged with the curved gate detent, the gate further comprising a lock rivet positioned for pivotal movement exteriorly of and adjacent to the first end section; (iii) a spring-biased gate lock pivotally mounted at its proximal end to the hook body in a positon exteriorly of and adjacent to the first end section, comprising an opening formed therethrough proximate its distal end and having open lock and closed lock detents formed within the opening, wherein the lock rivet is forcibly maintained in position due to its spring bias in either of the open lock and closed lock detents thereby locking the gate in either its open or closed positions, respectively, relative to the hook body.

In one embodiment the hook can further comprise an eye for a tag line fixedly attached to the hook body adjacent the proximal end of the gate lock. In another embodiment, the hook does not include an eye for a tag line.

BRIEF DESCRIPTION OF THE DRAWINGS

The present invention will be further understood and appreciated by reading the following Detailed Description in conjunction with the accompanying drawings, wherein:

FIGS. 1a and 1b are side elevation views of respective alternate embodiments of a hand line hook;

FIG. 2 is a side elevation view of a hand line in accordance with an embodiment of the present invention.

FIG. 3 is a side elevation view of a tag line eye in accordance with an embodiment of the present invention.

FIG. 4 is a side elevation view of a hand line in accordance with an embodiment of the present invention with the gate locked closed.

FIG. 5 is a side elevation view of a hand line in accordance with an embodiment of the present invention with the gate moved towards it locked open position.

FIG. 6 is a side elevation view of a hand line in accordance with an embodiment of the present invention with the gate locked open.

FIG. 7 is a side elevation view of a hand line in accordance with an embodiment of the present invention with the gate being moved towards its locked closed position.

FIG. 8 is a side elevation view of a hand line in accordance with an embodiment of the present invention with the gate in its locked open position.

DETAILED DESCRIPTION

Referring now to the drawings, wherein like reference numerals refer to like parts throughout, there is seen in FIG. 1 a hand line hook, designated generally by reference numeral 10, comprising a hook body 12, a spring biased gate 14 pivotally connected to hook body 12, and a spring biased gate lock 16 also pivotally connected to the hook body 12. In one embodiment (FIG. 1a) hook 10 further comprises an eye 18 attached to the hook body 10 adjacent the gate lock 16 that is used to attach a tag line, while in another embodiment (FIG. 1b) hook 10 does not include the tag line eye.

With regard to hook body 12, it comprises a curved nose section 21 positioned between a first end section 22 that terminates in a load bearing eye 23 and a second end section 24 that terminates in a curved gate detent 26 (see FIGS. 4-8). In one embodiment (FIG. 1a) tag line eye 18 is securely attached by rivets or other conventional fasteners to body 12 adjacent first end section 22.

With regard to gate 14, it is pivotally connected at one end to hook body 12 in proximity to the load bearing eye 23 and comprises a rivet 28 that extends transversely thereacross and is movable into and out of engaged relation with the curved gate detent 26. Hook body 12 is closed when rivet 28 is in engaged relation with curved gate detent 26 and is open when not engaged with curved gate detent 26. Gate 14 further comprises a lock rivet 30 positioned for pivotal movement exteriorly of and adjacent to the body's first end section 22. A conventional spring (leaf, soil, etc) can be mounted within gate 14 to effect it spring bias towards its closed position.

With regard to gate lock 16, it is pivotally mounted (by rivet 33 about which the pivot occurs) at its proximal end to the hook body 12 in a positon exteriorly of and adjacent to first end section 22. It comprises an opening 32 formed therethrough proximate its distal end and has open lock and closed lock detents 34, 36, respectively, formed within opening 32, wherein the lock rivet 30 is forcibly maintained in position due to its spring bias (coil spring, leaf spring, or other conventional spring can be mounted within gate lock 16 and/or around rivet 33 to effect the spring bias) in either of the open lock and closed lock detents 34, 36, thereby locking gate 14 in either its open or closed positions, respectively, relative to hook body 12.

What is claimed is:

1. A hand line hook, comprising:
   a) a hook body comprising a curved nose section positioned between a first end section and a second end section that terminates in a curved gate detent;
   b) a spring-biased, elongated gate pivotally connected at one end to said hook body in proximity to a load bearing eye and comprising a rivet that extends transversely thereacross and is pivotally movable into and out of engaged relation with said curved gate detent, wherein said hook body is closed when said rivet is in engaged relation with said curved gate detent and is open when not engaged with said curved gate detent, said gate further comprising a lock rivet positioned for pivotal movement exteriorly of and adjacent to said first end section;
   c) a spring-biased gate lock pivotally mounted at its proximal end to said hook body in a positon exteriorly of and adjacent to said first end section, comprising an opening formed therethrough proximate its distal end and having open lock and closed lock detents formed within said opening, wherein the opening comprises a curved segment having a first end with the closed lock detent, a straight segment having a second end with the open lock detent, and a connecting segment joining the curved segment to the straight segment, the straight segment extending along a portion of the curved segment forming a recess between the portion of the curved segment and the straight segment;
   d) wherein said lock rivet is forcibly maintained in position due to its spring bias in either of said open lock and closed lock detents thereby locking said gate in either its open or closed positions, respectively, relative to said hook body.

2. The hand line hook according to claim 1, wherein said load bearing eye is formed as a part of said hook body at its said first end section.

3. The hand line hook according to claim 1, further comprising a tag line eye fixedly attached to said hook body.

* * * * *